United States Patent
Calzia et al.

(10) Patent No.: US 8,709,917 B2
(45) Date of Patent: Apr. 29, 2014

(54) SELENIUM/GROUP 3A INK AND METHODS OF MAKING AND USING SAME

(75) Inventors: Kevin Calzia, Philadelphia, PA (US); David Mosley, Philadelphia, PA (US); David L. Thorsen, Pitman, NJ (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 77 days.

(21) Appl. No.: 12/782,032

(22) Filed: May 18, 2010

(65) Prior Publication Data
US 2011/0287610 A1   Nov. 24, 2011

(51) Int. Cl.
*H01L 21/322* (2006.01)
*H01L 31/00* (2006.01)
*B05D 5/12* (2006.01)

(52) U.S. Cl.
USPC ............................ 438/478; 427/76; 136/264

(58) Field of Classification Search
USPC .............. 252/500; 136/264; 438/478; 427/76
See application file for complete search history.

(56) References Cited

U.S. PATENT DOCUMENTS

| | | | |
|---|---|---|---|
| 5,863,836 A | 1/1999 | Jones | |
| 6,126,740 A | 10/2000 | Schulz et al. | |
| 6,379,585 B1 | 4/2002 | Vecht et al. | |
| 7,094,651 B2 | 8/2006 | Mitzi et al. | |
| 7,494,841 B2 | 2/2009 | Mitzi et al. | |
| 7,524,528 B2 | 4/2009 | Kodas et al. | |
| 2008/0135812 A1 | 6/2008 | Yu et al. | |
| 2008/0142082 A1* | 6/2008 | Yu et al. | 136/264 |
| 2008/0280030 A1 | 11/2008 | Van Duren et al. | |
| 2009/0260670 A1* | 10/2009 | Li | 136/244 |
| 2009/0280598 A1* | 11/2009 | Curtis et al. | 438/102 |

FOREIGN PATENT DOCUMENTS

| | | |
|---|---|---|
| WO | 9304212 | 3/1993 |
| WO | 2008057119 | 5/2008 |
| WO | 2008063190 | 5/2008 |

OTHER PUBLICATIONS

Mitzi, et al., A high-efficiency solution-deposited thin-film photovoltaic device, Advanced Materials, vol. 20, pp. 3657-3662 (2008)Mitzi, et al., A high-efficiency solution-deposited thin-film photovoltaic device, Advanced Materials, vol. 20, pp. 3657-3662 (2008).
Mitzi, et al., Low-voltage transistor employing a high-mobility spin-coated chalcogenide semiconductor, Advanced Materials, vol. 17, pp. 1285-1289 (2005).
Lu, et al., Study of the dissolution behavior of selenium and tellurium in different solvents—a novel route to Se, Te tubular bulk single crystals, Journal of Materials Chemistry, vol. 12, (2002).
Chichibu, et al. Use of diethylselenide as a less-hazardous source for preparation of CuInSe2 photo-absorbers by selenization of metal precursors, Journal of Crystal Growth, vol. 243, (2002).
Kemell, et al., Thin film deposition methods for CuInSe2 solar cells, Critical Reviews in Solid State and Materials Sciences, vol. 30, pp. 1-31 (2005).
Weil, et al., CuInS2 Solar Cells by Air Stable Ink Rolling, Journal of American Chemical Society, vol. 132, No. 19, pp. 6642-6643 (2010).
Ryan, et al. Preparation of Dithioselenides via a Selenium Transfer Reagent, Tetrahedron Letters, vol. 38, No. 51, pp. 8829-8832 (1997).

\* cited by examiner

*Primary Examiner* — Ling-Siu Choi
*Assistant Examiner* — Monique Peets
(74) *Attorney, Agent, or Firm* — Thomas S. Deibert

(57) ABSTRACT

A selenium/Group 3a ink, comprising (a) a selenium/Group 3a complex which comprises a combination of, as initial components: a selenium component comprising selenium; a carboxylic acid component having a formula R—COOH, wherein R is selected from a $C_{1-10}$ alkyl, $C_{1-10}$ haloalkyl and a $C_{1-10}$ mercaptoalkyl; a Group 3a complex, comprising at least one Group 3a material selected from aluminum, indium, gallium and thallium complexed with a multidentate ligand; and, (b) a liquid carrier; wherein the selenium/Group 3a complex is stably dispersed in the liquid carrier.

15 Claims, No Drawings

SELENIUM/GROUP 3A INK AND METHODS OF MAKING AND USING SAME

The present invention relates to a selenium/Group 3a ink comprising, as initial components: a selenium component comprising selenium; a carboxylic acid component having a formula R—COOH, wherein R is selected from a $C_{1-10}$ alkyl, $C_{1-10}$ haloalkyl and a $C_{1-10}$ mercaptoalkyl; a Group 3a complex stably dispersed in the liquid carrier. The present invention further relates to a method of preparing the selenium/Group 3a ink and for using the selenium/Group 3a ink.

The fabrication of thin films of Group III/Group VI semiconductors (e.g., $In_xSe_y$) have been studied extensively over the past two decades for use in a number of potential applications including, for example, switching devices, photovoltaics, nonlinear optics, ionic batteries and high density phase change data storage devices. Of these potential applications use of the Group III/Group VI semiconductors in the preparation of a CIGS absorber layers and in the preparation of an $\gamma$-$In_2Se_3$ window layers (i.e., a CdS buffer layer substitute for use in photovoltaic cells) are extremely promising.

One challenge for these promising uses for Group III/Group VI semiconductors is the development of cost-effective manufacturing techniques. Conventional methods for depositing Group III/Group VI semiconductors typically involve the use of vacuum based processes, including, for example, vacuum evaporation, sputtering and chemical vapor deposition (e.g., metal-organic chemical vapor deposition). Such deposition techniques tend to exhibit low throughput capabilities and high cost. To facilitate the large scale, high throughput, low cost, manufacture of systems incorporating the use of Group III/Group VI semiconductor materials, it would be desirable to provide liquid based deposition techniques.

A method for the liquid deposition of a semiconductor precursor film is disclosed in U.S. Pat. No. 6,126,740 to Schulz et al. Schulz et al. disclose a colloidal suspension comprising metal chalcogenide nanoparticles and a volatile capping agent, wherein the colloidal suspension is made by the reaction of a metal salt with a chalcogenide salt in an organic solvent to precipitate a metal chalcogenide, recovery of the metal chalcogenide precipitate, and mixing of the metal chalcogenide precipitate with a volatile capping agent in a nonaqueous organic solvent. Schulz et al. further disclose that the colloidal suspension can be spray deposited onto a substrate to produce a semiconductor precursor film. Schulz et al. disclose that particular preferred metals for use in its colloidal suspension and method of use are copper, indium, gallium and cadmium.

A method for depositing indium selenide is disclosed by Mitzi, et al. in *Low-Voltage Transistor Employing a High-Mobility Spin-Coated Chalcogenide Semiconductor*, ADVANCED MATERIALS vol. 17, pp. 1285-89 (2005). Mitzi, et al. disclose the use of a hydrazinium precursor material for deposition of indium selenide to form an indium selenide channel of a thin film transistor.

The hydrazinium precursor materials disclosed by Mitzi, et al. remove hydrazine from the manufacturing step to produce semiconductor films. Notwithstanding, Mitzi, et al. do not eliminate the need for hydrazine. Rather, Mitzi, et al. still utilize hydrazine in the preparation of the hydrazinium precursor materials. Moreover, hydrazinium ion precursors pose a significant explosion risk, as documented by Eckart W. Schmidt in his book, *Hydrazine and Its Derivatives: Preparation, Properties, and Applications*, JOHN WILEY & SONS pp 392-401 (1984). The presence of numerous metal ions exacerbates the risk of hydrazinium explosion or detonation. This can be a problem because residual hydrazinium salts may accumulate in process equipment during manufacture, presenting an unacceptable safety risk.

Notwithstanding, there remains a need for a selenium/Group 3a ink for use in the manufacture of systems incorporating selenium/Group 3a semiconductors (e.g., switching devices, photovoltaics, nonlinear optics, ionic batteries and high density phase change data storage devices). In particular, a selenium/Group 3a ink that facilitates the deposition of an $M_aSe_b$ material, wherein M is a Group 3a material and wherein the mole ratio of M to Se in the deposited $M_aSe_b$ material is tailorable, which selenium/Group 3a ink formulations are preferably hydrazine and hydrazinium free.

The present invention provides a selenium/Group 3a ink, comprising: (a) a selenium/Group 3a complex which comprises a combination of, as initial components: a selenium component comprising selenium; a carboxylic acid component having a formula R—COOH, wherein R is selected from a $C_{1-10}$ alkyl, $C_{1-10}$ haloalkyl and a $C_{1-10}$ mercaptoalkyl; a Group 3a complex, comprising at least one Group 3a material selected from aluminum, indium, gallium and thallium complexed with a multidentate ligand; and, (b) a liquid carrier; wherein the selenium/Group 3b complex is stably dispersed in the liquid carrier.

The present invention also provides a method of preparing a selenium/Group 3a ink, comprising: providing a selenium component, comprising selenium; providing a carboxylic acid component having a formula R—COOH, wherein R is selected from a $C_{1-10}$ alkyl, $C_{1-10}$ haloalkyl and a $C_{1-10}$ mercaptoalkyl; providing a Group 3a complex, comprising at least one Group 3a material selected from aluminum, indium, gallium and thallium complexed with a multidentate ligand; providing a liquid carrier; combining the Group 3a complex, the carboxylic acid component and the liquid carrier; heating the combination with agitation to produce a combined Group 3a complex/carboxylic acid component; and, combining the selenium component and the combined Group 3a complex/carboxylic acid component to form the selenium/Group 3a ink; wherein the selenium/Group 3a ink is a stable dispersion.

The present invention also provides a method for depositing a $M_aSe_b$ material on a substrate, comprising: providing a substrate; forming a selenium/Group 3a ink, comprising: providing a selenium component, comprising selenium; providing a carboxylic acid component having a formula R—COOH, wherein R is selected from a $C_{1-10}$ alkyl, $C_{1-10}$ haloalkyl and a $C_{1-10}$ mercaptoalkyl; providing a liquid carrier; providing a Group 3a complex, comprising at least one Group 3a material selected from aluminum, indium, gallium and thallium complexed with a multidentate ligand; combining the selenium component, the carboxylic acid component, the Group 3a complex and the liquid carrier to form the selenium/Group 3a ink; wherein the selenium/Group 3a ink is a stable dispersion; depositing the selenium/Group 3a ink on the substrate; heating the deposited selenium/Group 3a ink to eliminate the liquid carrier leaving a $M_aSe_b$ material, wherein the mole ratio of M to Se in the deposited $M_aSe_b$ material on the substrate is 6:1 to 1:6; and, optionally, annealing the deposited $M_aSe_b$ material.

DETAILED DESCRIPTION

The Group 3a complex of the present invention is not a salt. Without wishing to be bound by theory, the selenium/Group 3a ink of the present invention can comprise (i) a selenium complex and a Group 3a complex stably dispersed together in a liquid carrier; (ii) a complex incorporating both selenium and a Group 3a material; or (iii) a combination of (i) and (ii).

As distinguished from the nonaqueous colloidal suspension taught by Schultz et al. in U.S. Pat. No. 6,126,740; any selenium/Group 3a complex present in the selenium/Group 3a ink of the present invention is not precipitated, isolated from solution and then redispersed. Rather, any selenium/Group 3a complex present in the selenium/Group 3a ink of the present invention is stable in the liquid carrier upon creation and remains stable pending its use.

The term "stable" as used herein and in the appended claims in reference to the selenium/Group 3a ink means that the selenium component, the carboxylic acid component and the Group 3a complex do not form a precipitate upon mixing to form the selenium/Group 3a ink in a liquid carrier at 22° C. under nitrogen.

The term "storage stable" as used herein and in the appended claims in reference to the selenium/Group 3a ink means that the selenium component, the carboxylic acid component and the Group 3a complex do not form a precipitate upon mixing in a liquid carrier to form the selenium/Group 3a ink or upon subsequent storage of the selenium/Group 3a ink at 22° C. under nitrogen for a period of at least five (5) minutes.

The term "extended stability" as used herein and in the appended claims in reference to the selenium/Group 3a ink means that the selenium component, the carboxylic acid component and the Group 3a complex do not form a precipitate upon mixing in a liquid carrier to form the selenium/Group 3a ink or upon subsequent storage of the selenium/Group 3a ink at 22° C. under nitrogen for a period of at least two (2) hours.

The term "hydrazine free" as used herein and in the appended claims in reference to the selenium/Group 3a ink means that the selenium/Group 3a ink contains <100 ppm hydrazine.

The term "hydrazinium free or $(N_2H_5)^+$ free" as used herein and in the appended claims in reference to the selenium/Group 3a ink means that the selenium/Group 3a ink contains <100 ppm hydrazinium complexed with selenium.

The selenium component of the present invention comprises selenium. Preferably, the selenium component is selenium.

The carboxylic acid component has a formula R—COOH, wherein R is selected from $C_{1-10}$ alkyl, $C_{1-10}$ haloalkyl and $C_{1-10}$ mercaptoalkyl (preferably $C_{1-5}$ alkyl, $C_{1-5}$ haloalkyl and $C_{1-5}$ mercaptoalkyl). Preferably, R is selected to enhance the stability of the selenium/Group 3a ink. Given the teachings provided herein, one of ordinary skill in the art will know through routine experimentation how to determine what carboxylic acid components are suitable for use in the invention. Most preferred carboxylic acid components for use in indium containing selenium/Group 3a inks of the present invention are selected from 2-mercaptopropionic acid; formic acid; trifluoroacetic acid; acetic acid; propionic acid and mixtures thereof. Most preferred carboxylic acid components for use in gallium containing selenium/Group 3a inks of the present invention are selected from 2-ethylbutyric acid, mercaptoproprionic acid, formic acid, trifluoroacetic acid, acetic acid, propionic acid and mixtures thereof.

The carboxylic acid component is believed to provide the selenium/Group 3a ink of the present invention with enhanced stability. The molar ratio of Group 3a material to the carboxylic acid component is selected to tailor the properties of the selenium/Group 3a ink as desired. Without wishing to be bound by theory, it is believed that a higher molar ratio of carboxylic acid component to Group 3a material in the selenium/Group 3a ink of the present invention correlates with greater stability of the selenium/Group 3a ink. Preferably, the molar ratio of Group 3a material to the carboxylic acid component in the selenium/Group 3a ink is 2:1 to 1:16, more preferably 1:1 to 1:6, still more preferably 1:1 to 1:4, most preferably 1:1 to 1:2.

The Group 3a complex of the present invention comprises: (a) a Group 3a material selected from aluminum, gallium, indium and thallium; preferably selected from gallium and indium; most preferably indium; and (b) a multidentate ligand coordinated with the Group 3a ion. Without wishing to be bound by theory, it is believed that, relatively speaking, the use of higher denticity ligands in the preparation of the Group 3a complex decreases the reactivity of the Group 3a material in the Group 3a complex with selenium in the selenium component while the selenium component and the Group 3a complex are dispersed in the liquid carrier (e.g., tridentate ligands result in higher stability relative to bidentate or monodentate ligands). It is believed that higher denticity ligands exhibit a higher affinity for the Group 3a material in the Group 3a complex and are therefore more difficult for selenium to displace from the Group 3a material while dispersed in the liquid carrier.

The multidentate ligands in the Group 3a complex preferably include diketones. More preferably, the Group 3a complex includes a multidentate ligand selected from butanedionate, pentanedionate, hexanedionate, heptanedionate, cyclohexanedionate, 1,1,1,5,5,5-hexafluoroacetylacetone complexed with the Group 3a material. Most preferably, the Group 3a complex includes pentanedionate complexed with the Group 3a material.

The Group 3a complex of the present invention is preferably indium, gallium or a mixture thereof; complexed with a multidentate ligand. Optionally, the Group 3a complex is a gallium complex, preferably gallium complexed with a diketone, most preferably gallium complexed with pentanedionate. Optionally, the Group 3a complex is an indium complex, preferably indium complexed with a diketone, most preferably indium complexed with pentanedionate.

Optionally, the selenium component and the carboxylic acid component are combined to form a combined selenium/carboxylic acid component in a liquid vehicle (as defined herein). Preferably, the combined selenium/carboxylic acid component comprises ≥1 wt % selenium; wherein the combined selenium/carboxylic acid component is a stable dispersion and wherein the selenium/carboxylic acid component is hydrazine and hydrazinium free.

Optionally, the Group 3a complex and the carboxylic acid component are combined to form a combined Group 3a complex/carboxylic acid component.

Liquid carrier used in the selenium/Group 3a ink of the present invention can be any solvent in which the selenium component, the carboxylic acid component and the Group 3a complex are stably dispersible. Given the teachings provided herein, one of ordinary skill in the art will know, through routine experimentation, how to determine what solvents are suitable for use in the invention. That is, one of ordinary skill in the art will know, through routine experimentation, which solvents result in gelation. For example, monodentate amine solvents exhibit reduced solubility of Group 3a complexes and are also poor solvents for the selenium component. Preferably, the liquid carrier is selected from amine solvents (a) having two nitrogen atoms per molecule, wherein the nitrogen atoms are either (i) separated by at least 3 carbon atoms (e.g., "—C—C—C—") in the molecular formula of the amine solvent or (ii) the nitrogen atoms are constituents of an unsaturated ring structure in the molecular formula of the amine solvent (e.g., an imidazole ring); and (b) having at least three nitrogen atoms per molecule of the amine solvent. More preferably, the liquid carrier is selected from 1,3-diaminopropane; diethylenetriamine; 1-methylimidazole; tris(2-aminoethyl)amine; triethylenetetramine; tetraethylenepentamine and tetramethyl guanidine. Still more preferably, the liquid carrier is selected from 1,3-diaminopropane; diethylenetriamine; triethylenetetramine; tetramethylquanidine and 1-methylimidazole. Most preferably, the liquid carrier is 1,3-diaminopropane.

The selenium/Group 3a ink of the present invention can, optionally, further comprise a cosolvent. Cosolvents suitable for use with the present invention are miscible with the liquid carrier contained in the selenium/Group 3a ink and do not have the effect of destabilizing the selenium/Group 3a ink. Preferred cosolvents further exhibit a boiling point within 30° C. of the boiling point of the liquid carrier contained in the selenium/Group 3a ink.

The selenium/Group 3a ink of the present invention can, optionally, further comprise an agent selected from a dispersant, a wetting agent, a polymer, a binder, an anti-foaming agent, an emulsifying agent, a drying agent, a tiller, an extender, a film conditioning agent, an antioxidant, a plasticizer, a preservative, a thickening agent, a flow control agent, a leveling agent, a corrosion inhibitor and a dopant (e.g., sodium to improve electrical performance of CIGS absorber materials). Optional agents can be incorporated into the selenium/Group 3a ink of the present invention to, for example, facilitate increased shelf life, to improve flow characteristics to facilitate the method of application to a substrate (e.g., printing, spraying), to modify the wetting/spreading characteristics of the ink onto the substrate, to enhance the compatibility of the selenium/Group 3a ink with other inks used to deposit other components on the substrate (e.g., other constituents of a CIGS absorber material, such as Cu), and to modify the decomposition temperature of the selenium/Group 3a ink.

Preferably, the selenium/Group 3a ink of the present invention is a non-aqueous ink (i.e., contains ≤10 wt %, more preferably ≤1 wt %, most preferably ≤0.1 wt % water). It is believed that water present in the raw materials (e.g., liquid vehicle, optional agent) used can react with the Group 3a complex to produce insoluble Group 3a oxides.

The selenium content of the selenium/Group 3a ink of the present invention can be selected to suit the particular application need and the processing technology and equipment to be used to apply the selenium/Group 3a ink to a given substrate. Preferably, the selenium/Group 3a ink exhibits a selenium content selected from 1 to 50 wt %; 1 to 5 wt %; 4 to 15 wt % and 5 to 10 wt % (based on the weight of the selenium/Group 3a ink). Optionally, the selenium/Group 3a ink exhibits a selenium content of 1 to 50 wt % (based on the weight of the selenium/Group 3a ink). Optionally, the selenium/Group 3a ink exhibits a selenium content of 1 to 5 wt % (based on the weight of the selenium/Group 3a ink). Optionally, the selenium/Group 3a ink exhibits a selenium content of 4 to 15 wt % (based on the weight of the selenium/Group 3a ink). Optionally, the selenium/Group 3a ink exhibits a selenium content of 5 to 10 wt % (based on the weight of the selenium/Group 3a ink).

The mole ratio of selenium to Group 3a material in the selenium/Group 3a ink of the present invention is tailorable. Preferably, the mole ratio of the selenium to Group 3a material in the selenium/Group 3a ink of the present invention is tailored to be 6:1 to 1:6. More preferably, the mole ratio of the selenium to Group 3a material in the selenium/Group 3a ink of the present invention is tailored to be 3:1 to 1:3. Still more preferably, the mole ratio of selenium to Group 3a material in the selenium/Group 3a ink of the present invention is tailored to be 2:1 to 1:2. Most preferably, the mole ratio of the selenium to Group 3a material in the selenium/Group 3a ink of the present invention is tailored to be 1.5:1 to 1:1.5.

Without wishing to be bound by theory, it is believed that the stability of the selenium/Group 3a ink is determined by five main factors, namely 1) the solubility of the Group 3a complex in the liquid carrier; 2) selection of the R group in the carboxylic acid component; 3) selection of the molar ratio of the carboxylic acid component to the Group 3a material; 4) selection of the liquid carrier; and, 5) coordination of the Group 3a material in the Group 3a complex by ligands capable of regulating reaction of the Group 3a material with selenium while dispersed in the liquid carrier. By selection and control of these five main factors, it is believed possible to tailor the stability of the selenium/Group 3a ink for a given application. That is, the desired stability may vary depending on the method to be used to deposit the selenium/Group 3a ink onto a substrate. In some cases, it will be desirable to mix the selenium component and the Group 3a complex well in advance of the time when the selenium/Group 3a ink is to be deposited onto a substrate (e.g., hours). In these situations, the selenium/Group 3a ink can be formulated to exhibit extended stability. In some cases, it will be desirable for the customer/user to combine the selenium component and the Group 3a complex shortly before the selenium/Group 3a ink is to be deposited onto a substrate (e.g., within minutes of deposition onto a substrate). In these situations, the selenium/Group 3a ink can be formulated to be at least storage stable. In some cases, it will be desirable for the customer/user to combine the selenium component and the Group 3a complex contemporaneously with the deposition of the selenium/Group 3a ink onto a substrate (e.g., simultaneous co-deposition of the selenium component and the Group 3a complex wherein the components are mixed momentarily before or as they contact the substrate). In these situations, the selenium/Group 3a ink can be formulated to be at least stable.

Preferably, the selenium/Group 3a ink of the present invention is hydrazine free and hydrazinium free.

A method of preparing a selenium/Group 3a ink of the present invention, comprises: providing a selenium component; providing a carboxylic acid component; providing a Group 3a complex; providing a liquid carrier; and forming a combination of the selenium component, the carboxylic acid component, the Group 3a complex and the liquid carrier, providing the selenium/Group 3a ink. Preferably, the Group 3a complex and the carboxylic acid component are combined to form a combined Group 3a complex/carboxylic acid component before combining with the selenium component to form the selenium/Group 3a ink. Alternatively, the selenium component and the carboxylic acid component are combined to form a combined selenium/carboxylic acid component before combining with the Group 3a complex to form the selenium/Group 3a ink.

In providing the selenium component for use in the preparation of the selenium/Group 3a ink of the present invention, the selenium and the liquid carrier are preferably combined by adding the liquid carrier to the selenium. More preferably, the selenium and liquid carrier are combined using inert techniques, followed with continuous agitation and heating to reflux until the selenium is dissolved in the liquid carrier. Preferably, the liquid carrier is maintained at a temperature of 20 to 240° C. during the combining of the liquid carrier and the selenium. Optionally, the liquid carrier and selenium can be heated above the melting point of selenium (220° C.) during the combining process.

Providing a combined Group 3a complex/carboxylic acid component for use in the preparation of the selenium/Group 3a ink of the present invention, comprises: providing a Group 3a complex; providing a carboxylic acid component; and providing an appropriate liquid vehicle, wherein the liquid vehicle is selected from a liquid carrier (as defined herein), a cosolvent (as defined herein) or a mixture thereof; combining the Group 3a complex, the carboxylic acid component and the liquid vehicle; optionally, heating the combination (preferably to a temperature below the boiling point temperature of the liquid vehicle) with agitation (preferably for a period of 0.1 to 12 hrs; more preferably for a period of 0.1 to 8 hrs) to form the combined Group 3a complex/carboxylic acid component stably dispersed in the liquid vehicle. Preferably, the molar ratio of Group 3a material to the carboxylic acid component in the combined Group 3a complex/carboxylic acid component is 2:1 to 0.1:6, more preferably 1:1 to 1:6, still more preferably 1:1 to 1:4, most preferably 1:1 to 1:2.

In providing the combined Group 3a complex/carboxylic acid component for use in the preparation of the selenium/Group 3a ink of the present invention, the carboxylic acid component provided is selected from carboxylic acids having a formula R—COOH, wherein R is selected from $C_{1-10}$ alkyl, $C_{1-10}$ haloalkyl and $C_{1-10}$ mercaptoalkyl (preferably $C_{1-5}$ alkyl, $C_{1-5}$ haloalkyl and mercaptoalkyl. The R group in the carboxylic acid component used can be selected to enhance the solubility or inhibit gelation of the resulting combined Group 3a complex/carboxylic acid component in the liquid vehicle. Given the teachings provided herein, one of ordinary skill in the art will know through routine experimentation how to determine what carboxylic acid components are suitable for use in the invention. Most preferred carboxylic acid components for use in indium containing selenium/Group 3a inks of the present invention are selected from 2-mercaptopropionic acid; formic acid; trifluoroacetic acid; acetic acid; propionic acid and mixtures thereof. Most preferred carboxylic acid components for use in gallium containing selenium/Group 3a inks of the present invention are selected from 2-ethylbutyric acid, mercaptoproprionic acid, formic acid, trifluoroacetic acid, acetic acid, propionic acid and mixtures thereof.

Preferably, in providing the combined Group 3a complex/carboxylic acid component for use in the preparation of the selenium/Group 3a ink of the present invention, the carboxylic acid component is preferably added to the combined Group 3a complex and liquid vehicle. More preferably, providing the combined Group 3a complex/carboxylic acid component for use in preparation of the selenium/Group 3a ink of the present invention, optionally, further comprises: heating the combined Group 3a complex and liquid carrier at least one of before, after or during the addition of the carboxylic acid component. Yet still more preferably, the combined Group 3a complex and liquid carrier are maintained at a temperature of 20 to 100° C. during the addition of the carboxylic acid component. Most preferably, the carboxylic acid component is added to the combined Group 3a complex and liquid carrier by gradually adding the carboxylic acid component to the combined Group 3a complex and liquid carrier with continuous agitation.

The Group 3a complex can, optionally, be prepared by combining simple salts of Group 3a material with a ligand in an appropriate liquid vehicle, wherein the liquid vehicle is selected from a liquid carrier (as defined herein), a cosolvent (as defined herein) or a mixture thereof. For instance, indium nitrate or gallium nitrate can be reacted with a deprotonated pentanedione in an appropriate liquid vehicle to form an indium pentanedionate or gallium pentanedionate, respectively. Some Group 3a complexes are also available commercially, for example indium pentanedionate and gallium pentanedionate. For commercially available Group 3a complexes, the Group 3a complex can, optionally, be combined with an appropriate liquid vehicle, wherein the liquid vehicle is selected from a liquid carrier (as defined herein), a cosolvent (as defined herein), or mixtures thereof. Some raw materials used in combination with a Group 3a material with ligand or a Group 3a complex (e.g., optional carboxylic acid component, optional agent and liquid vehicle) can result in the formation of a precipitate. For example, in cases where the raw materials (e.g., optional carboxylic acid component, optional agent, liquid vehicle) contain water, it is believed that the water will react with the Group 3a complex to form an insoluble Group 3a oxide. For combinations where a precipitate is formed, the Group 3a complex, optional carboxylic acid component (i.e., combined Group 3a complex/carboxylic acid component), and optional agent in liquid vehicle will be present as the supernate, which can be withdrawn from the container for use in the preparation of a selenium/Group 3a ink of the present invention using well known methods such as by decanting and by cannula.

In providing the selenium component and the Group 3a complex for use in the preparation of the selenium/Group 3a ink of the present invention, the liquid carrier used is any solvent or combination of solvents in which the selenium component and the Group 3a complex are stably dispersible. Preferably, the liquid carrier is selected from amine solvents (a) having two nitrogen atoms per molecule, wherein the nitrogen atoms are either (i) separated by at least 3 carbon atoms (e.g., "—C—C—C—") in the molecular formula of the amine solvent or (ii) the nitrogen atoms are both constituents of an unsaturated ring structure in the molecular formula of the amine solvent (e.g., an imidazole ring); and (b) having at least three nitrogen atoms per molecule of the amine solvent. More preferably, the liquid carrier is selected from 1,3-diaminopropane; diethylenetriamine; 1-methylimidazole; tris(2-aminoethyl)amine; triethylenetetramine; tetraethylenepentamine and tetramethylquanidine. Still more preferably, the liquid carrier is selected from 1,3-diaminopropane; diethylenetriamine; triethylenetetramine; tetramethylquanidine and 1-methylimidazole. Most preferably, the liquid carrier is 1,3-diaminopropane.

Optionally, the method of preparing the selenium/Group 3a ink of the present invention, further comprises: providing a cosolvent; and, combining the cosolvent with the selenium component, the Group 3a complex and the liquid carrier. Optionally, the cosolvent is used in the preparation of the Group 3a complex. Suitable cosolvents are miscible with the liquid carrier contained in the selenium/Group 3a ink and do not have the effect of destabilizing the selenium/Group 3a ink. Preferred cosolvents further exhibit a boiling point within 30° C. of the boiling point of the liquid carrier contained in the selenium/Group 3a ink.

Optionally, the method of preparing the selenium/Group 3a ink of the present invention, further comprises: providing an optional agent; and, combining the optional agent with the liquid carrier; wherein the optional agent is selected from a dispersant, a wetting agent, a polymer, a binder, an antifoaming agent, an emulsifying agent, a drying agent, a filler, an extender, a film conditioning agent, an antioxidant, a plasticizer, a preservative, a thickening agent, a flow control agent, a leveling agent, a corrosion inhibitor and a dopant.

The selenium/Group 3a ink of the present invention can be used in, for example, the manufacture of switches, photovoltaics (either in preparation of a CIGS absorber layer or a γ-$In_2Se_3$ window layer), nonlinear optics, ionic batteries and high density phase change data storage devices.

The method of applying a $M_aSe_b$ material on a substrate using the selenium/Group 3a ink of the present invention, comprises: providing a substrate; providing a selenium/Group 3a ink of the present invention and applying the selenium/Group 3a ink to the substrate forming a $M_aSe_h$ precursor on the substrate; treating the $M_aSe_h$ precursor to remove the liquid carrier depositing a $M_aSe_h$ material on the substrate; wherein the mole ratio of selenium to M in the selenium/Group 3a ink is 6:1 to 1:6 (preferably 3:1 to 1:3; more preferably 2:1 to 1:2; most preferably 1.5:1 to 1:1.5); wherein M is at least one Group 3a material selected from aluminum, gallium, indium and thallium (preferably gallium and indium; most preferably indium); and wherein the mole ratio of M to Se in the deposited $M_aSe_h$ material on the substrate is 6:1 to 1:6 (preferably 3:1 to 1:3; more preferably 2:1 to 1:2; most preferably 1.5:1 to 1:1.5).

In the method of applying a $M_aSe_h$ material on a substrate using a selenium/Group 3a ink of the present invention, the selenium/Group 3a ink of the present invention can be applied to the substrate using conventional liquid processing techniques such as wet coating, spray coating, spin coating, doctor blade coating, contact printing, top feed reverse printing, bottom feed reverse printing, nozzle feed reverse printing, gravure printing, microgravure printing, reverse microgravure printing, comma direct printing, roller coating, slot die coating, meyerbar coating, lip direct coating, dual lip direct coating, capillary coating, ink-jet printing, jet deposition, spray pyrolysis and spray deposition. Optionally, the selenium/Group 3a ink of the present invention can be applied to the substrate using conventional spray pyrolysis techniques. Preferably, the selenium/Group 3a ink of the present invention is applied to the substrate under an inert atmosphere (e.g., under nitrogen).

After applying a selenium/Group 3a ink of the present invention to a substrate, the deposited material is heated to remove any residual liquid carrier or cosolvent. Preferably, the deposited material is further annealed by subjecting it to a temperature of 200 to 650° C. with an annealing time of 0.5 to 60 minutes. When using the selenium/Group 3a ink of the present invention to deposit a $In_2Se_3$ window layer in a photovoltaic cell, it is desirable to anneal the deposited material with an annealing temperature of 350 to 450° C.

The substrate used in the method depositing a selenium/Group 3a ink of the present invention can be selected from conventional materials used in conjunction with the preparation of semiconductor systems. In some applications, the substrate can be a coating on a carrier substance, such as, glass, foil, and plastic (e.g., polyethylene terephthalate and polyimides). Optionally, the substrate is sufficiently flexible to facilitate roll-to-roll production of CIGS materials for use in photovoltaic devices. When used in the preparation of a CIGS absorber material, the substrate is preferably molybdenum. When used in the preparation of a window layer in a photovoltaic device, the substrate is preferably the absorber layer material.

Some embodiments of the present invention will now be described in detail in the following Examples. Note that the In(acac)$_3$ (also known as indium (III) acetylacetonate and indium 2,4-pentanedionate) and Ga(acac)$_3$ (also known as gallium (III) acetylacetonate and gallium 2,4-pentanedionate) used in the examples was obtained from Sigma-Aldrich.

EXAMPLES 1-30

Preparation of Combined Group 3a Complex/Carboxylic Acid Component in Liquid Carrier Group 3a complex plus additive in liquid carrier combinations were prepared using the materials and the amounts thereof indicated in TABLE 1. Specifically, the indicated Group 3a complex was weighed out in air in a glass vial with a stir bar in the amount indicated in TABLE 1. Any indicated additive in the solid state (e.g., p-toluene thiol) were then added to the glass vial in the amount indicated in TABLE 1, followed by addition of the indicated liquid carrier in the indicated amount and then the addition of any indicated additive in the liquid state in the indicated amount. The glass vial was then sealed up and inerted under nitrogen gas. The glass vial was then placed on a hot plate with stirring for 1 hour with a hot plate temperature set point of 23° C. The hot plate set point temperature was then raised to 70° C. and the vial was left on the hot plate with stirring for an hour. The hot plate was then turned off. Observations are provided in TABLE 1. Note that in some instances a white precipitate formed. In those instances where a white precipitate formed, the supernate product (Group 3a complex+additive in liquid carrier) was decanted drawn from the glass vial for use in the preparation of selenium/Group 3a inks.

EXAMPLE 31

Preparation of Selenium Component in Liquid Carrier

To a 250 mL glass sonication vessel, 3 grams of selenium powder and 72 grams of 1,3-diaminopropane were weighed out. The vessel was configured with a 500 W sonication horn from Sonics, Inc. The vessel was inerted with nitrogen and sonicated at 60% power for 4 hours. The vessel was then wrapped with insulation so that the reaction vessel could be heated by the sonication horn to about 100° C., with an additional 4 hours of sonication. The product was then transferred to an inerted container by cannula and stored under nitrogen.

TABLE 1

| Ex | Group 3a Complex (3aC) | Mass 3aC (in g) | Liquid Carrier (LC) | Mass LC (in g) | Carboxylic Acid Component 1 (CAC1) | Mass CAC1 (in g) | Carboxylic Acid Component 2 (CAC2) | Mass CAC2 (in g) | Observ. |
|---|---|---|---|---|---|---|---|---|---|
| 1 | In(acac)$_3$ | 0.2015 | 1,3-diaminopropane | 2.576 | formic acid | 0.023 | — | — | A |
| 2 | In(acac)$_3$ | 0.2010 | 1,3-diaminopropane | 2.55 | formic acid | 0.045 | — | — | C |
| 3 | In(acac)$_3$ | 0.2018 | 1,3-diaminopropane | 2.5424 | trifluoro acetic acid | 0.056 | — | — | C |
| 4 | In(acac)$_3$ | 0.2001 | 1,3-diaminopropane | 2.4892 | trifluoro acetic acid | 0.111 | — | — | C |
| 5 | In(acac)$_3$ | 0.2004 | 1,3-diaminopropane | 2.5704 | acetic acid | 0.029 | — | — | C |
| 6 | In(acac)$_3$ | 0.2016 | 1,3-diaminopropane | 2.5396 | acetic acid | 0.059 | — | — | C |
| 7 | In(acac)$_3$ | 0.2008 | 1,3-diaminopropane | 2.5631 | propionic acid | 0.036 | — | — | C |
| 8 | In(acac)$_3$ | 0.0210 | 1,3-diaminopropane | 2.5267 | propionic acid | 0.072 | — | — | C |
| 9 | In(acac)$_3$ | 0.2014 | 1,3-diaminopropane | 2.4948 | 2-mercaptopropionic acid | 0.104 | — | — | A |

TABLE 1-continued

| Ex | Group 3a Complex (3aC) | Mass 3aC (in g) | Liquid Carrier (LC) | Mass LC (in g) | Carboxylic Acid Component 1 (CAC1) | Mass CAC1 (in g) | Carboxylic Acid Component 2 (CAC2) | Mass CAC2 (in g) | Observ. |
|---|---|---|---|---|---|---|---|---|---|
| 10 | Ga(acac)₃ | 0.296 | 1,3-diaminopropane | 2.46 | acetic acid | 0.048 | — | — | A |
| 11 | Ga(acac)₃ | 0.295 | 1,3-diaminopropane | 2.41 | acetic acid | 0.097 | — | — | A |
| 12 | Ga(acac)₃ | 0.297 | 1,3-diaminopropane | 2.44 | propionic acid | 0.060 | — | — | A |
| 13 | Ga(acac)₃ | 0.297 | 1,3-diaminopropane | 2.38 | propionic acid | 0.120 | — | — | A |
| 14 | Ga(acac)₃ | 0.295 | 1,3-diaminopropane | 2.41 | 2-ethylbutyric acid | 0.093 | — | — | A |
| 15 | Ga(acac)₃ | 0.297 | 1,3-diaminopropane | 2.32 | 2-ethylbutyric acid | 0.188 | — | — | A |
| 16 | Ga(acac)₃ | 0.296 | 1,3-diaminopropane | 2.41 | trifluoroacetic acid | 0.092 | — | — | C |
| 17 | Ga(acac)₃ | 0.297 | 1,3-diaminopropane | 2.32 | trifluoroacetic acid | 0.185 | — | — | C |
| 18 | Ga(acac)₃ | 0.2954 | 1,3-diaminopropane | 2.3338 | 2-mercaptopropionic acid | 0.171 | — | — | C |
| 19 | Ga(acac)₃ | 0.2936 | 1,3-diaminopropane | 2.4696 | formic acid | 0.037 | — | — | C |
| 20 | Ga(acac)₃ | 0.295 | 1,3-diaminopropane | 2.43 | formic acid | 0.074 | — | — | C |
| 21 | In(acac)₃ | 0.200 | 1,3-diaminopropane | 2.53 | 2-mercaptopropionic acid | 0.052 | formic acid | 0.022 | A |
| 22 | In(acac)₃ | 0.2004 | 1,3-diaminopropane | 2.548 | acetic acid | 0.029 | formic acid | 0.022 | B |
| 23 | In(acac)₃ | 0.2009 | 1,3-diaminopropane | 2.52 | 2-ethyl butyric acid | 0.057 | formic acid | 0.022 | B |
| 24 | In(acac)₃ | 0.2016 | 1,3-diaminopropane | 2.5396 | propionic acid | 0.036 | formic acid | 0.023 | B |
| 25 | In(acac)₃ | 0.2017 | 1,3-diaminopropane | 2.52 | trifluoroacetic acid | 0.056 | formic acid | 0.023 | B |
| 26 | Ga(acac)₃ | 0.295 | 1,3-diaminopropane | 2.42 | acetic acid | 0.048 | formic acid | 0.037 | A |
| 27 | Ga(acac)₃ | 0.296 | 1,3-diaminopropane | 2.37 | 2-ethylbutyric acid | 0.094 | formic acid | 0.037 | A |
| 28 | Ga(acac)₃ | 0.295 | 1,3-diaminopropane | 2.41 | propionic acid | 0.060 | formic acid | 0.037 | A |
| 29 | Ga(acac)₃ | 0.296 | 1,3-diaminopropane | 2.37 | trifluoroacetic acid | 0.092 | formic acid | 0.037 | A |
| 30 | Ga(acac)₃ | 0.295 | 1,3-diaminopropane | 2.38 | 2-mercaptopropionic acid | 0.085 | formic acid | 0.037 | C |

A Slightly hazy solution, very small amount of white ppt following storage at room temperature (RT) for 18-36 hrs.
B Clear solution, very small amount of white ppt following storage at RT for 18-36 hrs.
C Clear solution, no ppt following storage at RT for 18-36 hrs.

EXAMPLES 32-61

Preparation of Selenium/Group 3a Inks

The Selenium/Group 3a inks were prepared in a glove box. In each example, to a 2 mL vial, mass of product of Example 31 noted in TABLE 2 and the combined Group 3a complex/carboxylic acid component in liquid carrier (G3aCAinLC) noted in TABLE 2 in the mass noted in TABLE 2 were added. The contents of the vial were then mixed by vortexing for 5 seconds. After mixing of the contents of the 2 mL vial, observations were made as noted in TABLE 2.

TABLE 2

| Ex | Prod. of Ex. 31 (in mg) | Group 3a complex in liquid carrier (G3aCinLC) | G3aCAinLC (in mg) | Observ. |
|---|---|---|---|---|
| 32 | 61 | Product of Example 9 | 89 | E |
| 33 | 61 | Product of Example 1 | 89 | D |
| 34 | 61 | Product of Example 21 | 89 | D |
| 35 | 61 | Product of Example 10 | 89 | D |
| 36 | 61 | Product of Example 5 | 89 | D |
| 37 | 61 | Product of Example 6 | 89 | D |
| 38 | 61 | Product of Example 7 | 89 | D |
| 39 | 61 | Product of Example 8 | 89 | D |
| 40 | 61 | Product of Example 22 | 89 | D |
| 41 | 61 | Product of Example 23 | 89 | D |
| 42 | 61 | Product of Example 24 | 89 | D |
| 43 | 61 | Product of Example 25 | 89 | D |
| 44 | 61 | Product of Example 3 | 89 | D |
| 45 | 61 | Product of Example 4 | 89 | D |
| 46 | 80 | Product of Example 10 | 70 | F |
| 47 | 80 | Product of Example 11 | 70 | F |
| 48 | 80 | Product of Example 12 | 70 | F |
| 49 | 80 | Product of Example 13 | 70 | F |
| 50 | 80 | Product of Example 14 | 70 | D |
| 51 | 80 | Product of Example 15 | 70 | D |
| 52 | 80 | Product of Example 26 | 70 | F |
| 53 | 80 | Product of Example 27 | 70 | D |
| 54 | 80 | Product of Example 28 | 70 | F |
| 55 | 80 | Product of Example 29 | 70 | F |
| 56 | 80 | Product of Example 16 | 70 | F |
| 57 | 80 | Product of Example 17 | 70 | F |
| 58 | 80 | Product of Example 18 | 70 | D |
| 59 | 80 | Product of Example 19 | 70 | F |
| 60 | 80 | Product of Example 30 | 70 | F |
| 61 | 80 | Product of Example 20 | 70 | F |

D No ppt upon initial mixing, no ppt after storage for 2 hrs at room temperature (RT).
E No ppt upon initial mixing, ppt formed after storage for 5 min. at RT.
F No ppt upon initial mixing; no ppt after storage for 5 min. at RT; no ppt after storage for 2 hrs at RT; thin layer attracted to bottom of container after storage for 2 hrs at RT.

EXAMPLES 62-65

Preparation of Selenium/Group 3a Films

The films of Examples 62-65 were prepared in a glove box under a nitrogen atmosphere. The substrate used for the preparation of each film was a 5×5 mm piece of molybdenum-coated glass. In each example, the substrate was heated on a hotplate set at 80° C. In each example, one drop of the Selenium/Group 3a ink noted in TABLE 3 was placed onto the substrate. After dropping the Selenium/Group 3a ink on the substrate, the hotplate set point temperature was ramped to 400° C. over a ramp time of about 15 minutes. The hotplate set point temperature was then held for 5 minutes at 400° C., before being switched off. The substrate was then allowed to cool to room temperature on the surface of the hotplate. The product films were then analyzed by at least one of x-ray defraction (2-theta scan) ("XRD") and energy dispersive x-ray spectroscopy ("EDS") as noted in TABLE 3. Those films analyzed by x-ray defraction (2-theta scan) were analyzed using a Rigaku D/MAX 2500 at 50 kV/200 mA of nickel filtered copper Kα radiation. The samples were scanned from 5 to 90 degrees of 2θ in steps of 0.03 degrees at 0.75 degrees/min. Reflection geometry was used and the samples were rotated at 20 RPM. The XRD scan output for Examples 62 and 63 showed x-ray diffraction peaks at d-spacings of 3.276, 2.0171 and 1.7524. These peaks match with the reports for a cubic $In_xSe_y$ phase, as mentioned in the reference Malik et al, J. MATER. RES., Vol. 24, No. 4, April 2009, pages 1375-87. EDS samples were mounted on conductive carbon tape and examined uncoated in a Hitachi 3400 VP-SEM in variable pressure mode. EDS spectra were collected with a 30 mm$^2$ SD Detector at 15 KeV. The EDS data provide the weight % ratio between the Group 3a material and selenium in the deposited films. The EDS data also show from 5-10 wt % carbon content in the unoptimized films and a signal from the underlying molybdenum substrate.

TABLE 5

| Ex | Selenium/Group 3a Ink | XRD | EDS | In (wt %) | Ga (wt %) | Se (wt %) |
|---|---|---|---|---|---|---|
| | | | | Results EDS Film Composition | | |
| 62 | Product of Example 37 | yes | yes | 47.3 | — | 38.75 |
| 63 | Product of Example 38 | yes | yes | 46.81 | — | 40.92 |
| 64 | Product of Example 48 | no | yes | — | 41.36 | 34.9 |
| 65 | Product of Example 50 | no | yes | — | 32.65 | 19.88 |

We claim:

1. A selenium/Group 3a ink, comprising:
   (a) a selenium/Group 3a complex which comprises a combination of, as initial components:
      a selenium powder;
      a carboxylic acid component having a formula R—COOH, wherein R is selected from the group consisting of a $C_{1-10}$ alkyl, $C_{1-10}$ haloalkyl and a $C_{1-10}$ mercaptoalkyl;
      a Group 3a complex, comprising at least one Group 3a material complexed with a multidentate ligand; wherein the Group 3a material is selected from the group consisting of aluminum, indium, gallium and thallium; and wherein the multidentate ligand is selected from the group consisting of butanedionate; pentanedionate; hexanedionate; heptanedionate; cyclohexanedionate; and 1,1,1,5,5,5-hexafluoroacetylacetone; and,
   (b) a liquid carrier, wherein the liquid carrier is a nitrogen containing solvent selected from:
      an amine solvent having two nitrogen atoms per molecule, wherein the nitrogen atoms are separated by at least three carbon atoms in an aliphatic chain or the nitrogen atoms are both contained in an unsaturated ring structure; and,
      an amine solvent having at least three nitrogen atoms per molecule;
   wherein the selenium powder, the carboxylic acid component and the Group 3a complex do not form a precipitate upon combination in the liquid carrier;
   wherein the selenium powder and the Group 3a complex form a complex incorporating both selenium and the Group 3a material; and,
   wherein the selenium/Group 3a ink is hydrazine free and hydrazinium free.

2. The ink of claim 1, wherein the Group 3a complex comprises an indium complex.

3. The ink of claim 1, wherein the Group 3a complex comprises a gallium complex.

4. The ink of claim 1, wherein the liquid carrier is selected from the group consisting of 1,3-diaminopropane; diethylenetriamine; 1-methylimidazole; tris(2-aminoethyl)amine; triethylenetetramine; tetraethylenepentamine and tetramethyl guanidine.

5. The ink of claim 1, wherein the liquid carrier is 1,3-diaminopropane.

6. A method of preparing a selenium/Group 3a ink, consisting essentially of:
   providing a selenium powder;
   providing a carboxylic acid component having a formula R—COOH, wherein R is selected from the group consisting of 2-mercaptopropionic acid, formic acid, trifluoracetic acid, acetic acid, propionic acid and mixtures thereof;
   providing a Group 3a complex, comprising at least one Group 3a material complexted with a multidentate ligand; wherein the Group 3a material is selected from the group consisting of aluminum, indium, gallium and thallium; and wherein the multidentate ligand is selected from the group consisting of butanedionate; pentanedionate; hexanedionate; heptanedionate; cyclohexanedionate; and 1,1,1,5,5,5-hexafluoroacetylacetone;
   providing a liquid carrier, wherein the liquid carrier is a nitrogen containing solvent selected from (a) an amine solvent having two nitrogen atoms per molecule, wherein (i) the nitrogen atoms are separated by at least 3 carbon atoms in an aliphatic chain or (ii) the nitrogen atoms are both contained in an unsaturated ring structure (e.g., an imidazole ring); and (b) an amine solvent having three or more nitrogen atoms per molecule;
   combining the selenium powder, the carboxylic acid component, the Group 3a complex and the liquid carrier to form the selenium/Group 3a ink;
   wherein the selenium powder, the carboxylic acid component and the Group 3a complex do not form a precipitate upon combination in the liquid carrier;
   wherein the selenium powder and the Group 3a complex form a complex incorporating both selenium and the Group 3a material; and,
   wherein the selenium/Group 3a ink is hydrazine free and hydrazinium free.

7. The method of claim 6, wherein the Group 3a complex and the carboxylic acid component are combined to form a combined Group 3a complex/carboxylic acid component before combining with the selenium powder to form the selenium/Group 3a ink.

8. A method for depositing a $M_aSe_b$ material on a substrate, comprising:
   providing a substrate;
   forming a selenium/Group 3a ink according to the method of claim 6;
   depositing the selenium/Group 3a ink on the substrate;
   heating the deposited selenium/Group 3a ink to eliminate the liquid carrier leaving the $M_aSe_b$ material, wherein M is the Group 3a material and wherein the mole ratio of M to Se in the deposited $M_aSe_b$ material on the substrate is 6:1 to 1:6; and,
   optionally, annealing the deposited $M_aSe_b$ material.

9. The method of claim 8, wherein the Group 3a complex and the carboxylic acid component are combined to form a combined Group 3a complex/carboxylic acid component before combining with the selenium powder to form the selenium/Group 3a ink.

10. The method of claim 8, wherein the selenium powder and the carboxylic acid component are combined to form a combined selenium/carboxylic acid component before combining with the Group 3a complex to form the selenium/Group 3a ink.

11. The selenium/Group 3a ink of claim 1, wherein the selenium/Group 3a ink, consists essentially of:

(a) the selenium/Group 3a complex, wherein the selenium/Group 3a complex consists essentially of the combination of, as initial components:
    the selenium powder;
    the carboxylic acid component having the formula R—COOH; and,
    the Group 3a complex; and,
(b) to liquid carrier.

12. The ink of claim 11, wherein the Group 3a complex is an indium complex.

13. The ink of claim 11, wherein the Group 3a complex is a gallium complex.

14. The ink of claim 11, wherein the liquid carrier is selected from the group consisting of 1,3-diaminopropane, diethylenetriamine; 1-methylimidazole; tris(2-aminoethyl) amine; triethylenetetramine; tetraethylenepentamine and tetramethyl guanidine.

15. The ink of claim 11, wherein the liquid carrier is 1,3-diaminopropane.

* * * * *